United States Patent [19]
Mack

[11] Patent Number: 5,228,542
[45] Date of Patent: Jul. 20, 1993

[54] CALIPER BRAKE FOR A BICYCLE WHEEL

[75] Inventor: Christoph Mack, West Redding, Conn.

[73] Assignee: Cannondale Corporation, Georgetown, Conn.

[21] Appl. No.: 890,633

[22] Filed: May 28, 1992

[51] Int. Cl.⁵ .............................................. B62L 1/02
[52] U.S. Cl. .............................. 188/24.12; 188/24.22
[58] Field of Search ............... 188/24.11, 24.12, 24.19, 188/24.21, 24.22, 24.15, 24.14; 74/501.5 R

[56] References Cited

U.S. PATENT DOCUMENTS 5,099,958  3/1992  D'Aluisio .................... 188/24.12 X

FOREIGN PATENT DOCUMENTS 0848448  10/1939  France .......................... 188/24.12
0882501   6/1943  France .......................... 188/24.12
0449845  11/1974  U.S.S.R. ........................ 188/24.12

Primary Examiner—Robert J. Oberleitner
Assistant Examiner—Lee W. Young
Attorney, Agent, or Firm—Brumbaugh, Graves, Donohue & Raymond

[57] ABSTRACT

A caliper brake for a wheel of a bicycle comprises a pair of pivot mounts, each of which is adapted to be mounted on a bicycle member laterally of a wheel rim, one on either side of the wheel. A brake arm is pivotally mounted in cantilevered relation on each pivot mount adjacent its lower end, is biased away from the wheel rim, and has a brake shoe affixed to it intermediate of its ends. A pivot bolt is affixed to a member of the bicycle above the wheel, and a spring retainer is mounted in a fixed position on the pivot bolt. A cam member is pivotally mounted on the pivot bolt adjacent to the spring retainer. A brake lever cable is connected directly to the upper end of one brake arm, and a sheath of the brake lever cable terminates at an end in engagement with the cam member. One end of a cable is affixed to the upper end of the other brake arm and at its other end to the cam. Stop surfaces on the cam member and the spring retainer engage to stop the pivotal movement of the cam member under the bias of a spring and thereby limit the rotation of the cam member under the bias of the spring.

3 Claims, 2 Drawing Sheets

CALIPER BRAKE FOR A BICYCLE WHEEL

BACKGROUND OF THE INVENTION

Although a great many specific designs for bicycle brakes have been proposed and commercialized, most of them fall into one or the other of two categories, center pull and side pull. In center pull type brakes, the brake arms are connected to each other by a cable, and the brake lever cable is connected to the center of the connecting cable and directly pivots the brake arms by transmitting the force applied to the lever cable to the connecting cable. U.S. Pat. Nos. 4,754,853 (Nagano, Jul. 5, 1988) and 4,546,858 (Nagano, Oct. 5, 1985) describe and show typical designs for center pull brakes. In the Nagano designs the brake arms are pivotally mounted in cantilevered relation at their lower ends. In a variation of a center pull type brake, as shown, for example in U.S. Pat. No. 4,027,746 (Kine, Jun. 7, 1977), L-shaped brake arms are pivotally mounted intermediate their ends on a bracket. Kine also shows the modification of having a connecting arm rather than a cable.

An inherent characteristic of center pull brakes is that the force applied to each brake arm is less that the force applied to the brake lever cable; the lever cable force is transmitted to the two brake arms along a path that is at an angle to the lever cable, so the applied force is the resultant force at the angle formed between the brake cable and the connecting cable (or its equivalent) of one-half of the brake lever cable force. For example, if each branch of the connecting cable forms an angle of 45 degrees with the lever cable, the force in the connecting cable is 0.707 times the lever cable force.

Side-pull type brakes make use of the foreshortening of the distance between the end of a sheath around the brake lever cable and the end of the lever cable and the reaction force established in the sheath in response to the lever cable force. One brake lever is directly connected to the lever cable, and the other brake lever is connected to the lever cable sheath. Accordingly, both brake arms are subject the full force applied to the brake cable, the force on one arm being the direct force of the lever cable and the force on the other arm being the reaction force acting on the sheath. The advantage of side-pull brakes is that the full force of the brake lever cable is applied to both brake arms. The disadvantage is that the brake arms are relatively large and add weight to the bicycle. Various designs of side-pull brakes are found in U.S. Pat. No. 4,766,979 (Nagano, Aug. 31, 1988), French Pat. No. 893,772 (Simon, 1944), French Pat. No. 902,657 (Pecquois, 1945), French Pat. No. 919,492 (Finley, 1947), French Pat. No. 963,949 (Sejalon, 1950) and German Published Pat. Appln. No. 37 09 804 (Schmid, 1988).

French Pat. No. 893,772 (Simon, 1944) describes and shows bicycle brakes in which the cable wire pulls directly on one brake arm and the cable sheath applies a reaction force to a lever, which is connected to the other brake arm. Inasmuch as the cable sheath is relatively stiff, the return of the brakes to a retracted state after having been applied is not ensured, and dragging of a shoe may occur.

U.S. Pat. No. 5,099,958 describes and shows caliper brakes comprising a pair of pivot mounts, each of which is adapted to be mounted on a bicycle member that is located laterally of and below a wheel rim, one on either side of the wheel. A brake arm is pivotally mounted in cantilevered relation on each pivot mount adjacent its lower end and is biassed away from the wheel rim. A brake shoe is affixed to each brake arm intermediate the ends. A roller is affixed to a member of the bicycle above the wheel. A brake lever cable is connected directly to the upper end of one brake arm, and a sheath of the brake lever cable terminates in spaced-apart relation to the upper end of said one brake arm and has its end received in a holder. A yoke cable is affixed to the upper end of the other brake arm, passes partway around the roller, and is affixed to the sheath holder.

In the brakes of U.S. Pat. No. 5,099,958, the force of the brake lever cable is applied directly to the brake arm to which it is directly connected. When that brake lever engages the wheel rim and can no longer move, the force in the lever cable tending to reduce the length of the part of the cable between the sheath holder at the brake lever end and the point of attachment of the cable to the lever arm causes the cable sheath to deflect. Because the sheath is essentially incompressible, it exerts a reaction force equal and opposite to the force in the lever cable, and its displacement is reflected as a movement of the sheath holder at the brake arm end toward the brake arm to which the lever cable is attached, and away from the roller. The movement of the sheath holder pulls the yoke cable around the roller and pivots the brake arm to which it is attached into engagement with the wheel rim. Thus the lever cable force is applied directly to the brake arm to which it is attached, and the reaction force is applied to the brake arm to which the yoke cable is attached. The lever arms can be kept small and light in weight; the yoke cable and roller are small and light as compared to the portions of brake arms in previously known side-pull brakes required to enable the sheath to act on one arm and the cable on the other. The size and weight advantage of center pull brakes is attained, while the advantage of applying an undiminished force to the brakes found in side pull brakes is also enjoyed.

The Caliper brakes described and shown in U.S. Pat. No. 5,099,958 have been commercialized in some models of bicycles made by Cannondale Corporation, the assignee of the present invention, and have been generally satisfactory. Widespread use of the brakes has, however, revealed two shortcomings: first, the brake pads have to be adjusted very accurately at a relatively close clearance from the wheel rims; second, the brakes have a somewhat "mushy" feeling response. Both shortcomings result from the fact that the portion of the cable that runs over the pulley bends or bows somewhat near the pulley, rather than remaining straight, when no force is applied to the cable by the sheath; the springs that retract the brake shoe levers are not strong enough, relative to the stiffness of the cable, to keep the cable taut when the brakes are retracted (not applied). Therefore, when the user applies the brakes, the initial part of the squeezing of the brake operating lever is relatively soft while the brake shoes move into engagement with the wheel, the next part of the motion is harder as the cable straightens, and the final movement is under full resistance of the application of the brakes. The second phase of the operation of the brakes is somewhat ambiguous in feeling to the user—hence the term "mushy."

SUMMARY OF THE INVENTION

An object of the present invention is to provide bicycle wheel brakes in which the brake lever cable force is transmitted substantially undiminished to the brake arms. It is also an object of the invention to provide bicycle wheel brakes that are highly responsive to operation of the brake lever by the rider and that are easy to adjust so as to obtain excellent response to operator control. Also, it is desired that the size and weight of the brakes be kept low and that the structure of the brakes be such as to make the brakes simple and economical to produce and assemble.

The foregoing and other objects are attained, in accordance with the present invention, by caliper brakes for a wheel of a bicycle comprising a pair of pivot mounts, each of which is adapted to be mounted on a bicycle member laterally of a wheel rim, one on either side of the wheel. A brake arm is pivotally mounted in cantilevered relation on each pivot mount adjacent its lower end, is biassed away from the wheel rim, and has a brake shoe affixed to it intermediate of its ends. A pivot bolt is affixed to a member of the bicycle above the wheel, and a spring retainer is mounted in a fixed position on the pivot bolt. A cam member is pivotally mounted on the pivot bolt adjacent to the spring retainer. A brake lever cable is connected directly to the upper end of one brake arm, and a sheath of the brake lever cable terminates at an end in engagement with the cam member. One end of a cable is affixed to the upper end of the other brake arm and at its other end to the cam, the cable extending in a substantially straight line between the brake arm and the cam when the brake arm is biassed away from the wheel rim. A spring coupled between the cam member and the spring retainer biases the cam member about its pivot mounting in a direction corresponding to the direction in which the cable connected to it leads from the cam to the brake arm. Stop surfaces on the cam member and the spring retainer engage to stop the pivotal movement of the cam member under the bias of the spring and thereby limit the rotation of the cam member under the bias of the spring.

In a preferred embodiment of the invention, a bushing is received on the pivot bolt between it and the cam member, and the spring retainer is received on the pivot bolt in a position between an abutment of the bicycle member to which the bolt is affixed and the bushing and is clamped between the abutment and the bushing. The cam member has a spring pocket facing a portion of the spring retainer. The stop surface of the spring retainer is a stop bolt that extends into the spring recess. The stop surface on the cam member is an end wall of the spring pocket. The spring is a compression spring received in the spring pocket and engaged between the stop bolt and the other end wall of the of the spring pocket.

For a better understanding of the invention, reference may be made the following description of an exemplary embodiment, taken in conjunction with the figures of the accompanying drawings.

DESCRIPTION OF THE EMBODIMENT

Figure 1:
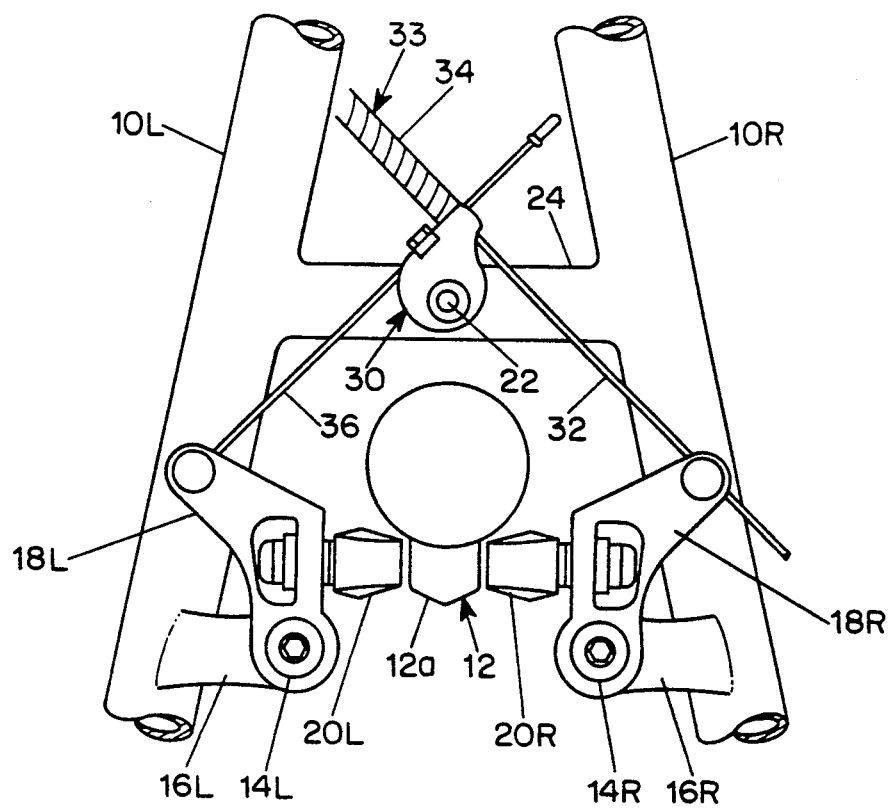
FIG. 1 is an elevational view of the embodiment, showing it when the brakes are retracted (not applied)
Figure 2:
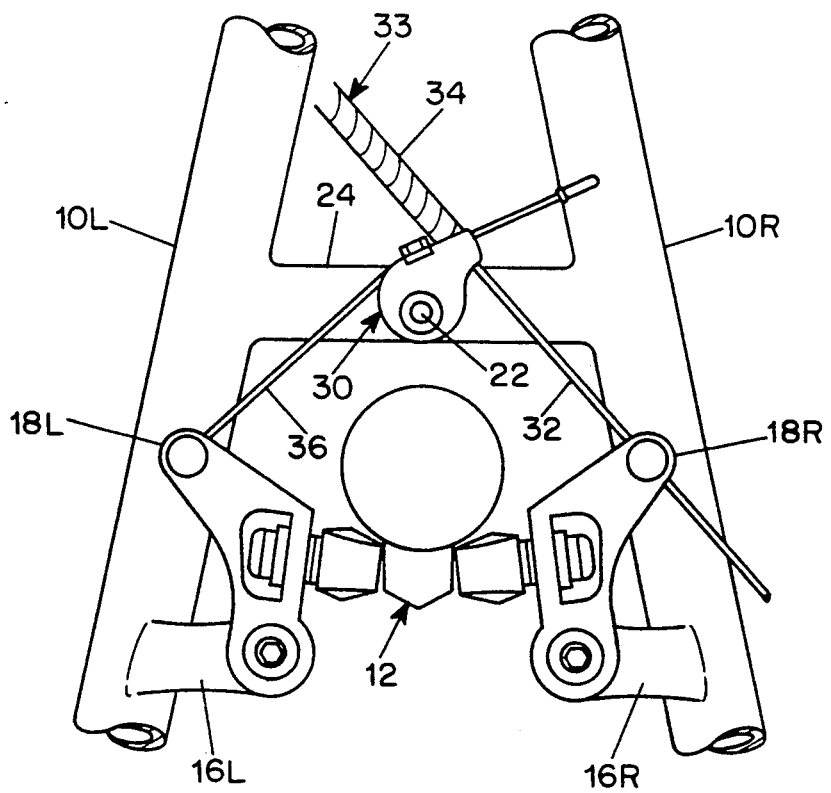
FIG. 2 is an elevational view of the embodiment, showing it when the brakes are engaged (applied)

The embodiment is shown in FIGS. 1 and 2 installed on the seat stays 10L and 10R for braking the rear wheel 12. A pivot mount 14L, 14R is affixed to each of a pair of short struts 16L, 16R welded to the seat stays laterally of and somewhat below the wheel rim 12a. A brake arm 18L, 18R is pivotally mounted in cantilevered relation on each pivot mount 14 adjacent its lower end and is biassed away from the wheel rim by a spring (not shown). A brake shoe 20L, 20R is affixed to each brake arm intermediate the ends thereof.

Figure 3:
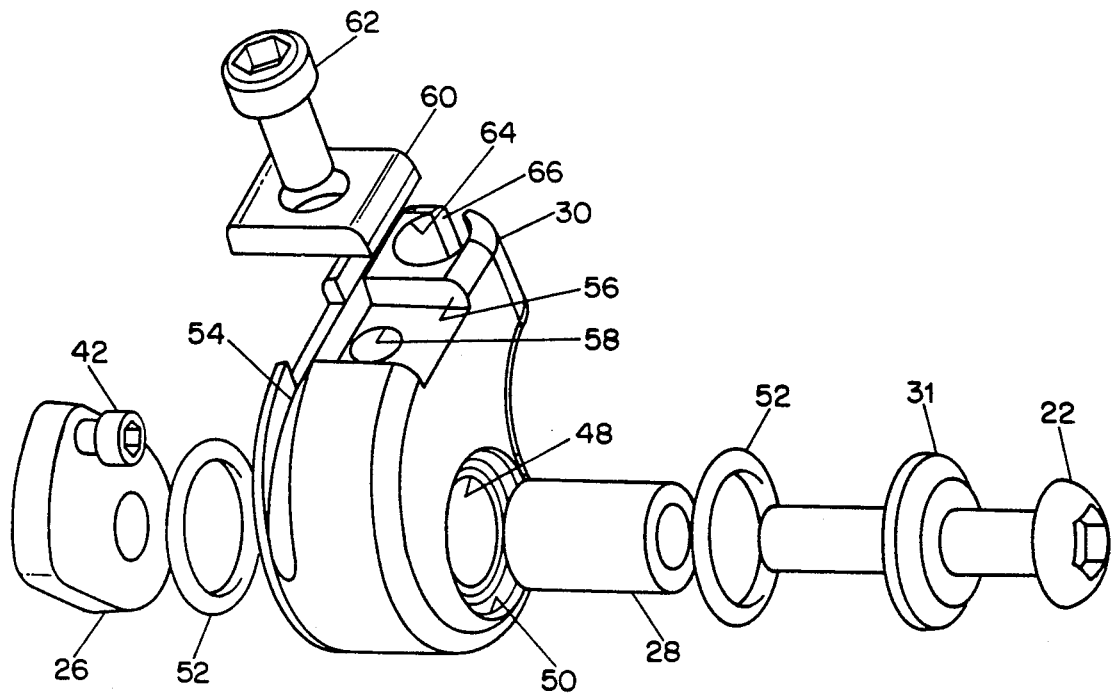
FIG. 3 is an exploded front three-quarter pictorial view of the spring retainer, the cam member and the mounting components.

A pivot bolt 22 is threaded into a threaded fitting (not shown) affixed to a bridge 24 that extends between the seat stays above the wheel. A spring retainer 26 (see FIGS. 3 and 4) is received on the pivot bolt and is clamped in place between the end of a bushing 28 received on the pivot bolt and the fitting. A cam member 30 is pivotally mounted to pivot about the bushing, which is received on the pivot bolt between the spring retainer 26 and a pivot washer 31. The cable 32 of a sheathed brake lever cable 33 is connected directly to the upper end of one brake arm 18R, and the end of the sheath 34 of the brake lever cable 33 terminates in engagement with the cam member 30. A bare wire cable 36 is affixed adjacent one end to the upper end of the other brake arm 18L and is affixed adjacent to its other end to the cam member 30. The cable 36 extends in a substantially straight line between the brake arm 18L and the cam member 30 when the brake lever is biassed away from the wheel rim. A spring 38 coupled between the cam member 30 and the spring retainer 26 biases the cam member about its pivot mounting (the pivot bolt 22) in a direction corresponding to the direction in which the cable 36 connected to it leads from the cam member 30 to the brake arm 18L.

Figure 4:
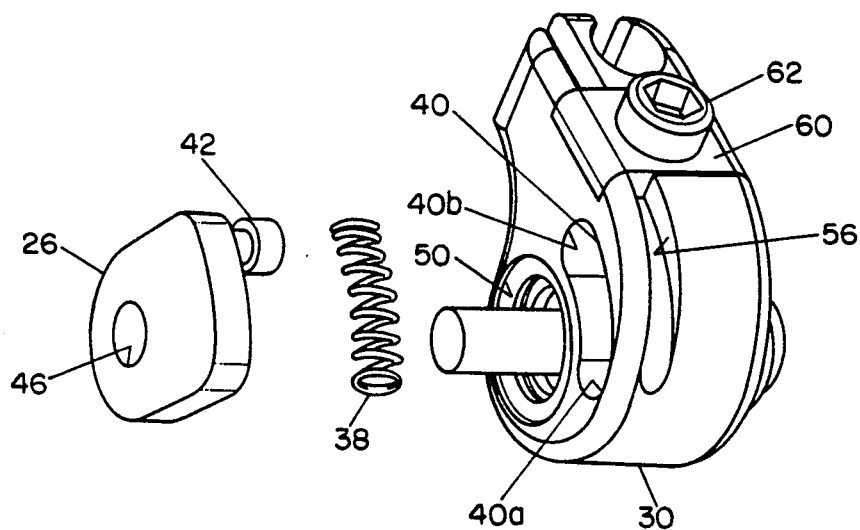
FIG. 4 is an exploded rear pictorial view of the spring retainer and cam member.

The cam member 30 has an arcuate open spring pocket 40 facing a portion of the spring retainer 26 (FIG. 4). A stop bolt 42 is threaded into the spring retainer 26 and extends into the spring pocket. The spring 38 is a compression coil spring and is engaged under compression between the bolt 42 and the lower end wall 40a of the pocket. The upper end wall 40b of the pocket in the cam member serves as a stop surface by engaging the stop bolt when the spring biases the cam member counterclockwise.

The spring retainer 26 may be manufactured from a blank cut to a suitable thickness from an aluminum extrusion by drilling and tapping a hole for the stop bolt and drilling a hole 46 for the pivot bolt. The cam member can also be produced from an extrusion having the "comma" shape of the front and back aspects and machining it to provide the following details:

A hole 48 for the pivot bolt and its bushing;
Counterbores 50 at each end for O-rings 52, which seal the bushing and keep it clean for free pivoting over a long service time without maintenance;
A cable slot 54 for the cable 36;
A transverse groove 56 and a tapped hole 58 for reception and fastening of an anchor washer 60 and anchor bolt 62 by which the cable 36 is affixed (by clamping) to the cam member;
A receptacle 64 for the brake cable sheath 34 and a slot 66 for the brake cable wire 32.

The brakes are, of course, normally held in a retracted position (FIG. 1) by the springs associated with the arms 18L and 18R. In the case of the left brake, the spring 38 of the cam 30 biases the cam to the stop position, which is established by engagement of the stop bolt 42 by the end wall 40b of the spring pocket 40. The spring 38 ensures that the cam 30 does not hang up in a partially rotated position, thereby also ensuring that the left brake arm 18L is retracted and the shoe 20L does not drag.

When the rider squeezes the operating lever for the brakes, the cable 32 is pulled, and the right brake arm 18R pivots into engagement with the wheel rim 12a. Inasmuch as both arms are essentially equally free to pivot, force balancing causes the reaction force of the brake cable sheath 34, which is essentially incompressible lengthwise but free to displace, to pivot the cam 30 clockwise, which pulls on the cable 36 and pivots the left brake arm clockwise to engage the left shoe 12L with the wheel rim (FIG. 2). The full force of the cable 32 acts on the brake arm 18R, and an equal reaction force acts on the left brake arm 18L. Inasmuch as the cable 36 extends straight from the cam 30 to the brake arm 18L when the brake is not applied, the response of the brakes to the operating lever is not mushy. The spring-biassing of the cam to a stop position ensures that the proper clearance between left shoe 20L and the wheel rim is reestablished when the brakes are released.

The embodiment is shown and described above in conjunction the a rear wheel brake. The invention can also, of course, be applied to a front wheel brake, in which case the pivot mounts for the brake arms are installed on the front fork legs and the cam member, etc., on a fitting attached to the head tube. The specific configurations of the spring bolt and cam member are, of course, subject to many variations and modifications.

I claim:

1. A caliper brake for a wheel of a bicycle comprising a pair of pivot mounts, each of which is adapted to be mounted on a bicycle member laterally of a wheel rim, one on either side of the wheel, a brake arm pivotally mounted in cantilevered relation on each pivot mount adjacent its lower end and biassed away from the wheel rim, a brake shoe affixed to each brake arm intermediate the ends thereof, a pivot bolt adapted to be affixed to a member of the bicycle above the wheel, a spring retainer mounted in a fixed position on the pivot bolt, a cam member pivotally mounted on the pivot bolt adjacent to the spring retainer, a brake lever cable connected directly to the upper end of one brake arm, a sheath of the brake lever cable terminating at an end in engagement with the cam member, a cable affixed adjacent one end to the upper end of the other brake arm and affixed adjacent to its other end to the cam, the cable extending in a substantially straight line between said other brake arm and the cam when the brake lever is biassed away from the wheel rim, a spring coupled between the cam member and the spring retainer and biassing the cam member about its pivot mounting in a direction corresponding to the direction in which the cable connected to it leads from the cam to said other brake arm, and stop surfaces on the cam member and the spring retainer engageable to stop the pivotal movement of the cam member under the bias of the spring and thereby limit the rotation of the cam member under the bias of the spring.

2. A caliper brake according to claim 1 and further comprising a bushing received on the pivot bolt between it and the cam member, and wherein the spring retainer is received on the pivot bolt in a position between an abutment of the bicycle member to which the bolt is affixed and the bushing and is clamped between the abutment and the bushing.

3. A caliper brake according to claim 2 wherein the cam member has a spring pocket facing a portion of the spring retainer, the stop surface of the spring retainer is a stop bolt that extends into the spring recess, the stop surface on the cam member is an end wall of the spring pocket, and the spring is a compression spring received in the spring pocket and engaged between the stop bolt and the other end wall of the of the spring pocket.

* * * * *